(12) United States Patent
Yamamori et al.

(10) Patent No.: US 11,111,406 B2
(45) Date of Patent: Sep. 7, 2021

(54) COPOLYMER AND ANTIFOULING COATING COMPOSITION CONTAINING THE SAME

(71) Applicant: NIPPON PAINT MARINE COATINGS CO., LTD., Osaka (JP)

(72) Inventors: Naoki Yamamori, Osaka (JP); Mamoru Shimada, Osaka (JP); Yasuhisa Nagase, Osaka (JP); Masayuki Matsuda, Osaka (JP)

(73) Assignee: NIPPON PAINT MARINE COATINGS CO., LTD., Osaka (JP)

( * ) Notice: Subject to any disclaimer, the term of this patent is extended or adjusted under 35 U.S.C. 154(b) by 13 days.

(21) Appl. No.: 16/604,349

(22) PCT Filed: Jul. 2, 2019

(86) PCT No.: PCT/JP2019/026259
§ 371 (c)(1),
(2) Date: Oct. 10, 2019

(87) PCT Pub. No.: WO2020/009104
PCT Pub. Date: Jan. 9, 2020

(65) Prior Publication Data
US 2021/0024770 A1 Jan. 28, 2021

(30) Foreign Application Priority Data

Jul. 3, 2018 (JP) .............................. JP2018-126809

(51) Int. Cl.
*C09D 133/04* (2006.01)
*C09D 5/00* (2006.01)
*C08F 220/10* (2006.01)

(52) U.S. Cl.
CPC .......... *C09D 133/04* (2013.01); *C08F 220/10* (2013.01); *C09D 5/00* (2013.01); *C08F 2800/20* (2013.01)

(58) Field of Classification Search
CPC ....... C09D 133/04; C09D 5/00; C08F 220/10; C08F 2800/20
USPC ....................................................... 524/547
See application file for complete search history.

(56) References Cited

U.S. PATENT DOCUMENTS

| 2003/0139558 A1 | 7/2003 | Yamamori et al. |
| 2018/0201797 A1* | 7/2018 | Taniguchi ............. C09D 5/165 |

FOREIGN PATENT DOCUMENTS

| CA | 2 258 813 A1 | 7/1999 |
| CN | 103080249 A | 5/2013 |
| EP | 0 802 243 A2 | 10/1997 |
| EP | 0802243 A2 | 10/1997 |
| EP | 1 342 756 A1 | 9/2003 |
| EP | 1342756 A1 | 9/2003 |
| EP | 2 161 316 A1 | 3/2010 |
| JP | 1-146808 A | 6/1989 |
| JP | 01146808 A * | 6/1989 |
| JP | 2514217 B2 | 7/1996 |
| JP | 11-263937 A | 9/1999 |
| JP | 11-263939 A | 9/1999 |
| JP | 11-279455 A | 10/1999 |
| JP | 2000-17203 A | 1/2000 |
| JP | 2003-252931 A | 9/2003 |
| JP | 4769331 A | 9/2011 |
| KR | 10-2003-0074241 A | 9/2003 |
| KR | 10-0530968 B1 | 5/2006 |
| KR | 10-2009-0111814 A | 10/2009 |
| SG | 187606 A1 | 3/2013 |
| WO | 2012026237 A1 | 3/2012 |
| WO | 2014/175140 A1 | 10/2014 |
| WO | 2017/051922 A1 | 3/2017 |
| WO | WO-2017051922 A1 * | 3/2017 ............. C09D 5/165 |

OTHER PUBLICATIONS

International Search Report for PCT/JP2019/026259 dated, Sep. 10, 2019 (PCT/ISA/210).
Communication dated Mar. 24, 2020, issued by the Korean Intellectual Property Office in Korean Application No. 10-2019-7028770.
Communication dated May 25, 2020 from European Patent Office in EP Application No. 19790113.5.
Communication dated Jun. 8, 2020 from European Patent Office in EP Application No. 19790113.5.
Communication dated Jun. 12, 2020 from the China National Intellectual Property Administration in Application No. 201980001881.X.
Communication dated Jun. 26, 2020 from European Patent Office in EP Application No. 19790113.5.

(Continued)

*Primary Examiner* — Kelechi C Egwim
(74) *Attorney, Agent, or Firm* — Sughrue Mion, PLLC

(57) ABSTRACT

Provided are a copolymer containing: a structural unit (A) derived from a polymerizable monomer (a) having a silicon atom-containing group represented by formula (1) [wherein $R^1$, $R^2$, and $R^3$ each independently represent a hydrocarbon group having a carbon number of 1 to 6]; and a structural unit (B) derived from a polymerizable monomer (b) copolymerizable with the polymerizable monomer (a) with the content of the structural unit (A) being from 40 mass % to 80 mass % in 100 mass % of the copolymer, the content of the structural unit (B) being from 20 mass % to 60 mass % in 100 mass % of the copolymer, and an acid value derived from free carboxy group being from 0.1 KOHmg/g to 60 KOHmg/g; and an antifouling coating composition containing the copolymer.

6 Claims, No Drawings

(56) References Cited

OTHER PUBLICATIONS

Communication dated Sep. 2, 2020, issued by the Korean Intellectual Property Office in Korean Application No. 10-2019-7028770.
Communication dated Nov. 25, 2020, from the European patent office in application No. 19790113.5.

* cited by examiner

COPOLYMER AND ANTIFOULING COATING COMPOSITION CONTAINING THE SAME

CROSS REFERENCE TO RELATED APPLICATIONS

This application is a National Stage of International Application No. PCT/JP2019/026259 filed Jul. 2, 2019, claiming priority based on Japanese Patent Application No. 2018-126809, filed Jul. 3, 2018.

TECHNICAL FIELD

The present invention relates to a copolymer and an antifouling coating composition containing the copolymer.

BACKGROUND ART

Aquatic organisms, such as barnacles, mussels, and algae, are easily attached to underwater structures, ships, fishing nets, and the like. The attachment of these organisms arises problems associated with, for example, low efficient operation and extra consumption of fuel for ships and the like. The attachment of these organisms also arises problems associated with, for example, clogging and short life for fishing nets and the like. To prevent attachment of aquatic organisms, antifouling coating compositions have been applied to surfaces to form antifouling coating films.

Examples of antifouling coating compositions that have been used include an antifouling coating composition containing a triorganosilyl group-containing resin as a binder resin (vehicle) (e.g., WO 2014/175140 (PTL 1)). Since the surface of an antifouling coating film formed of this antifouling coating composition always be renewed as the triorganosilyl group is gradually hydrolyzed in water, the antifouling coating film may exhibit antifouling performance over a long term.

CITATION LIST

Patent Literature

PTL 1: WO 2014/175140 A1

SUMMARY OF INVENTION

Technical Problem

To maintain high the antifouling performance of the antifouling coating film for a long term, there is a need for a suitable and stable consumption rate of the coating film over a long term. However, an antifouling coating film formed of a conventional antifouling coating composition containing a triorganosilyl group-containing resin may lack stability in the consumption rate of its coating film because the consumption rate of this antifouling coating film starts to significantly increase after the antifouling coating film is immersed in water for a long time. In the case where the consumption rate starts to significantly increase, the time at which the coating film is completely consumed unintendedly comes early. It is thus difficult to maintain high antifouling performance for a desired long term.

An object of the present invention is to provide a copolymer and an antifouling coating composition containing the copolymer that enable formation of a coating film exhibiting stable consumption rate for a long term.

Solution to Problem

The present invention provides a copolymer and an antifouling coating composition described below.

[1] A copolymer containing:
a structural unit (A) derived from a polymerizable monomer (a) having a silicon atom-containing group represented by the following formula (1):

[Chemical 1]

[in the formula (1), $R^1$, $R^2$, and $R^3$ each independently represent a hydrocarbon group having a carbon number of 1 to 6]; and
a structural unit (B) derived from a polymerizable monomer (b) copolymerizable with the polymerizable monomer (a),
wherein the content of the structural unit (A) is greater than or equal to 40 mass % and less than or equal to 80 mass % in 100 mass % of the copolymer,
the content of the structural unit (B) is greater than or equal to 20 mass % and less than or equal to 60 mass % in 100 mass % of the copolymer, and
the acid value derived from free carboxy group is greater than or equal to 0.1 KOHmg/g and less than or equal to 60 KOHmg/g.

[2] The copolymer according to [1], wherein the acid value is greater than or equal to 0.1 KOHmg/g and less than or equal to 30 KOHmg/g.

[3] The copolymer according to [1], wherein the acid value is greater than or equal to 0.3 KOHmg/g and less than or equal to 20 KOHmg/g.

[4] The copolymer according to any of [1] to [3], wherein the structural unit (B) includes a structural unit derived from (meth)acrylic acid, and
the content of the structural unit derived from (meth)acrylic acid is greater than or equal to 0.02 mass % and less than or equal to 8 mass % in 100 mass % of the copolymer.

[5] A copolymer containing:
a structural unit (A) derived from a polymerizable monomer (a) having a silicon atom-containing group represented by the following formula (1):

[Chemical 2]

[in the formula (1), $R^1$, $R^2$, and $R^3$ each independently represent a hydrocarbon group having a carbon number of 1 to 6]; and
a structural unit (B) derived from a polymerizable monomer (b) copolymerizable with the polymerizable monomer (a), wherein the content of the structural unit (A) is greater than or equal to 40 mass % and less than or equal to 80 mass % in 100 mass % of the copolymer, the content of the structural unit (B) is greater than or equal to 20 mass % and less than or equal to 60 mass % in 100 mass % of the copolymer, the structural unit (B) includes a structural unit derived from (meth)acrylic acid, and the content of the structural unit derived from (meth) acrylic acid is greater than or equal to 0.02 mass % and less than or equal to 8 mass % in 100 mass % of the copolymer.

[6] The copolymer according to [4] or [5], wherein the content of the structural unit derived from (meth)acrylic acid is greater than or equal to 0.02 mass % and less than or equal to 5 mass % in 100 mass % of the copolymer.

[7] The copolymer according to [4] or [5], wherein the content of the structural unit derived from (meth)acrylic acid is greater than or equal to 0.05 mass % and less than or equal to 2.5 mass % in 100 mass % of the copolymer.

[8] The copolymer according to any of [1] to [7], wherein the content of the structural unit (A) is greater than or equal to 50 mass % and less than or equal to 65 mass % in 100 mass % of the copolymer, and
the content of the structural unit (B) is greater than or equal to 35 mass % and less than or equal to 50 mass % in 100 mass % of the copolymer.

[9] The copolymer according to any of [1] to [8], wherein the polymerizable monomer (a) is a monomer represented by the following formula (2):

[Chemical 3]

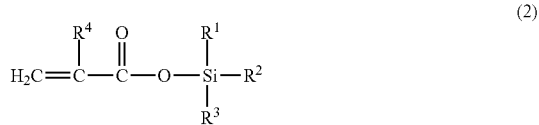

(2)

[In the formula (2), $R^1$, $R^2$, and $R^3$ each independently represent a hydrocarbon group having a carbon number of 1 to 6. $R^4$ represents a hydrogen atom or a methyl group.].

[10] An antifouling coating composition containing the copolymer according to any of [1] to [9].

[11] The antifouling coating composition according to [10] further containing an antifouling agent.

Advantageous Effects Of Invention

A copolymer that enable formation of a coating film exhibiting stable consumption rate for a long term as well as an antifouling coating composition containing the polymer can be provided.

DESCRIPTION OF EMBODIMENTS

<Copolymer>

A copolymer according to the present invention (hereinafter also referred to as a "copolymer") is preferred as a resin to be contained in an antifouling coating composition and can be used as a binder resin (vehicle) of the antifouling coating composition.

The copolymer according to the present invention and an antifouling coating composition containing the copolymer enable formation of an antifouling coating film exhibiting stable consumption rate for a long term. Furthermore, the copolymer according to the present invention and an antifouling coating composition containing the copolymer enable formation of an antifouling coating film retaining high antifouling performance for a long term.

Moreover, the copolymer according to the present invention can provide an antifouling coating composition having high storage stability.

Hereinafter, the stability of the consumption rate of a coating film (antifouling coating film) for a long term is also referred to as "long-term stability" in consumption rate, and the property of the coating film exhibiting high antifouling performance for a long term is also referred to as a "long-term antifouling property."

The copolymer contains a structural unit (A) derived from a polymerizable monomer (a) having a silicon atom-containing group represented by the above formula (1) and a structural unit (B) derived from a polymerizable monomer (b) copolymerizable with the polymerizable monomer (a). The copolymer normally consists of the structural unit (A) and the structural unit (B).

[1] Structural Unit (A)

The structural unit (A) is derived from the polymerizable monomer (a) having the silicon atom-containing group represented by the above formula (1).

The copolymer may contain only one kind of structural unit (A) or may contain two or more kinds of structural units (A).

Examples of the polymerizable monomer (a) include a radically polymerizable monomer represented by the above formula (2).

In formula (1) and formula (2), $R^1$, $R^2$, and $R^3$ each independently represent a hydrocarbon group having a carbon number of 1 to 6.

Examples of the monomer represented by formula (2) include trimethylsilyl (meth)acrylate, triethylsilyl (meth)acrylate, tri-n-propylsilyl (meth)acrylate, triisopropylsilyl (meth)acrylate, diisopropyl-sec-butylsilyl (meth)acrylate, diisopropyl-isobutylsilyl (meth)acrylate, diisopropyl-tert-butylsilyl (meth)acrylate, diisopropylhexylsilyl (meth)acrylate, diisopropylphenylsilyl (meth)acrylate, isopropyl-di-sec-butylsilyl (meth)acrylate, isopropyl-diisobutylsilyl (meth)acrylate, isopropyl-di-tert-butylsilyl (meth)acrylate, isopropyldiphenylsilyl (meth)acrylate, diphenylhexylsilyl (meth)acrylate, tri-sec-butylsilyl (meth)acrylate, triisobutylsilyl (meth)acrylate, tri-tert-butylsilyl (meth)acrylate, tert-butyldiphenylsilyl (meth)acrylate, triphenylsilyl (meth) acrylate, tricyclohexylsilyl (meth)acrylate, dicyclohexylbenzylsilyl (meth)acrylate, diisopropylcyclohexylsilyl (meth)acrylate, and isopropyldicyclohexylsilyl (meth)acrylate.

One kind of the monomer represented by formula (2) may be used or two or more kinds thereof may be used.

The term "(meth)acrylate" as used herein refers to at least one selected from methacrylate and acrylate.

From the viewpoint of the long-term stability in consumption rate of the coating film, the long-term antifouling property of the coating film, or the storage stability of the coating composition, in formula (1) and formula (2), $R^1$, $R^2$, and $R^3$ each independently represent preferably an alkyl group having a carbon number of 1 to 6, more preferably an alkyl group having a carbon number of 1 to 4, and still more preferably an alkyl group having a carbon number of 3 or 4.

From the same viewpoint, in formula (1) and formula (2), preferably, at least one of $R^1$, $R^2$, and $R^3$ represents an alkyl group having a carbon number of 3, more preferably, at least one of $R^1$, $R^2$, and $R^3$ represents an isopropyl group, still more preferably, at least two of $R^1$, $R^2$, and $R^3$ represent an isopropyl group, and yet still more preferably, all of $R^1$, $R^2$, and $R^3$ represent an isopropyl group.

From the same viewpoint, the monomer represented by formula (2) is preferably tri-n-propylsilyl (meth)acrylate, triisopropylsilyl (meth)acrylate, diisopropyl-sec-butylsilyl (meth)acrylate, diisopropyl-isobutylsilyl (meth)acrylate, diisopropyl-tert-butylsilyl (meth)acrylate, isopropyl-di-sec-butylsilyl (meth)acrylate, isopropyl-diisobutylsilyl (meth)acrylate, isopropyl-di-tert-butylsilyl (meth)acrylate, tri-sec-butylsilyl (meth)acrylate, triisobutylsilyl (meth)acrylate, or tri-tert-butylsilyl (meth)acrylate, more preferably tri-n-propylsilyl (meth)acrylate, triisopropylsilyl (meth)acrylate, diisopropyl-sec-butylsilyl (meth)acrylate, diisopropyl-isobutylsilyl (meth)acrylate, or diisopropyl-tert-butylsilyl (meth)acrylate, and still more preferably triisopropylsilyl (meth)acrylate, diisopropyl-sec-butylsilyl (meth)acrylate, diisopropyl-isobutylsilyl (meth)acrylate, or diisopropyl-tert-butylsilyl (meth)acrylate.

The polymerizable monomer (a) may be a monomer other than the monomer represented by formula (2).

One kind of the monomer other than the monomer represented by formula (2) may be used alone or two or more kinds thereof may be used. The monomer represented by formula (2) and a monomer other than the monomer represented by formula (2) may be used in combination. The polymerizable monomer (a) preferably includes the monomer represented by formula (2).

Examples of the monomer other than the monomer represented by formula (2) include a maleic acid diester having the silicon atom-containing group represented by formula (1). In the silicon atom-containing group represented by formula (1) of a maleic acid diester, $R^1$, $R^2$, and $R^3$ are as described above in formula (1).

Examples of the maleic acid diester include bis(triisopropylsilyl) maleate, triisopropylsilylmethyl maleate, triisopropylsilylethyl maleate, triisopropylsilyl-n-butyl maleate, triisopropylsilyl-sec-butyl maleate, triisopropylsilyl-isobutyl maleate, triisopropylsilyl-tert-butyl maleate, triisopropylsilyl-n-pentyl maleate, triisopropylsilyl-isopentyl maleate (triisopropylsilyl-isoamyl maleate), and triisopropylsilyl-cyclohexyl maleate.

The content of the structural unit (A) in the copolymer is normally greater than or equal to 40 mass %, and preferably greater than or equal to 50 mass % in 100 mass % of the copolymer. If the content of the structural unit (A) is less than 40 mass %, the consumption rate of the coating film is excessively low, and the coating film has inadequate antifouling performance.

The content of the structural unit (A) in the copolymer is normally less than or equal to 80 mass %, preferably less than or equal to 65 mass %, and more preferably less than or equal to 60 mass % in 100 mass % of the copolymer. If the content of the structural unit (A) is greater than 80 mass %, the long-term stability of the consumption rate of the coating film is not obtained. The structural unit (A) in a content greater than 80 mass % is disadvantageous in terms of costs for preparing the copolymer.

[2] Structural Unit (B)

The structural unit (B) is derived from the polymerizable monomer (b) copolymerizable with the polymerizable monomer (a). The polymerizable monomer copolymerizable with the polymerizable monomer (a) is specifically a monomer having a radically polymerizable unsaturated bond (e.g., double bond).

The copolymer may contain only one kind of structural unit (B) or may contain two or more kinds of structural units (B).

The content of the structural unit (B) in the copolymer is normally greater than or equal to 20 mass %, preferably greater than or equal to 35 mass %, and more preferably greater than or equal to 40 mass % in 100 mass % of the copolymer. If the content of the structural unit (B) is less than 20 mass %, the long-term stability of the consumption rate of the coating film is not obtained. The structural unit (B) in a content less than 20 mass % is disadvantageous in terms of costs for preparing the copolymer.

The content of the structural unit (B) in the copolymer is normally less than or equal to 60 mass %, and preferably less than or equal to 50 mass % in 100 mass % of the copolymer. If the content of the structural unit (B) is greater than 60 mass %, the consumption rate of the coating film is excessively low, and the coating film has inadequate antifouling performance.

Examples of the polymerizable monomer (b) include a monomer (b-1) having a free carboxy group (hereinafter also referred to as a "monomer (b-1)"), a monomer (b-2) containing an alkoxy group and/or an oxyalkylene chain in the ester moiety (hereinafter also referred to as a "monomer (b-2)"), and a monomer (b-3) other than the monomer (b-1) and the monomer (b-2) (hereinafter also referred to as a "monomer (b-3)").

For each of the monomers (b-1) to (b-3), one kind of the monomer may be used or two or more kinds of the monomers may be used. Two or more kinds of monomers selected from the monomers (b-1) to (b-3) may be used in combination.

[2-1] Monomer (b-1)

The copolymer preferably contains a structural unit derived from the monomer (b-1) having a free carboxy group. In other words, the copolymer preferably has a free carboxy group. The free carboxy group refers to a carboxy group (—COOH) that does not form a carboxylate anion (i.e., carboxylic acid salt). The presence of a free carboxy group in the copolymer can be determined by measuring an infrared absorption spectrum.

The presence of a free carboxy group in the copolymer (the presence of a structural unit derived from the monomer (b-1) having a free carboxy group) is advantageous in terms of long-term stability in the consumption rate of the coating film. Although not very clear, this may be because of a neighboring group effect of the free carboxy group that the free carboxy group functions as an autocatalyst in a hydrolysis reaction of the ester moiety (the silylester moiety represented by formula (1)) of the copolymer adjacent to the free carboxy group and increases the rate of the hydrolysis reaction. When a non-esterified free carboxy group is introduced to the copolymer in advance, and the silylester moiety undergoes a hydrolysis reaction due to the neighboring group effect from the initial stage of immersion of the coating film in water, the consumption rate of the coating film immersed for a long term may become constant for this term.

The improvement in the long-term stability of the consumption rate of the coating film is advantageous in order to improve the long-term antifouling property and also advantageous in order to facilitate coating film design (e.g., coating film thickness) in consideration of the period during which the coating film needs to exhibit antifouling performance.

Examples of the monomer (b-1) include unsaturated monobasic acids, such as (meth)acrylic acid, cinnamic acid, and crotonic acid; unsaturated dibasic acids and mono-alkyl esters thereof, such as maleic acid, fumaric acid, and itaconic acid, and mono-alkyl esters thereof; and unsaturated monobasic acid hydroxyalkyl ester-dibasic acid adducts, such as 2-hydroxyethyl (meth)acrylate-maleic acid adduct, 2-hydroxyethyl (meth)acrylate-phthalic acid adduct, and 2-hydroxyethyl (meth)acrylate-succinic acid adduct.

From the viewpoint of long-term stability in the consumption rate of the coating film, the monomer (b-1) is preferably (meth)acrylic acid, cinnamic acid, crotonic acid, maleic acid, and itaconic acid, more preferably (meth)acrylic acid and maleic acid, and still more preferably (meth)acrylic acid.

From the viewpoint of long-term stability in the consumption rate of the coating film, the content of the structural unit derived from the monomer (b-1) in the copolymer is preferably greater than or equal to 0.02 mass %, and more preferably greater than or equal to 0.05 mass % in 100 mass % of the copolymer.

The content of the structural unit derived from the monomer (b-1) in the copolymer is preferably less than or equal to 8 mass %, more preferably less than or equal to 5 mass %, and still more preferably less than or equal to 2.5 mass % in 100 mass % of the copolymer. If the content of the structural unit derived from the monomer (b-1) is greater than 8 mass %, the antifouling coating composition containing the copolymer has low storage stability, and the antifouling coating composition tends to have high viscosity or become gelled during storage.

From the viewpoint of long-term stability in the consumption rate of the coating film, the acid value derived from free carboxy group in the copolymer containing the structural unit derived from the monomer (b-1) is preferably greater than or equal to 0.1 KOHmg/g, and more preferably greater than or equal to 0.3 KOHmg/g.

The acid value derived from free carboxy group in the copolymer containing the structural unit derived from the monomer (b-1) is preferably less than or equal to 60 KOHmg/g, more preferably less than or equal to 30 KOHmg/g, and still more preferably less than or equal to 20 KOHmg/g. If the acid value derived from free carboxy group is greater than 60 KOHmg/g, the antifouling coating composition containing the copolymer has low storage stability, and the antifouling coating composition tends to have high viscosity or become gelled during storage.

The acid value derived from free carboxy group in the copolymer is determined by neutralization titration using phenolphthalein as an indicator in accordance with JIS K 0070.

[2-2] Monomer (b-2)

The copolymer preferably contains a structural unit derived from the monomer (b-2) containing an alkoxy group and/or an oxyalkylene chain in the ester moiety. The presence of the structural unit derived from the monomer (b-2) in the copolymer can appropriately increase the consumption rate of the coating film.

Examples of the alkoxy group include alkoxy groups having a carbon number of 1 to 6, such as methoxy group, ethoxy group, propoxy group, and butoxy group.

The oxyalkylene chain is represented by $-O-(CH_2)_n-$, where n is, for example, an integer greater than or equal to 1 and less than or equal to 18.

Examples of the monomer (b-2) include alkoxyalkyl (meth)acrylates, such as methoxyethyl (meth)acrylate and ethoxyethyl (meth)acrylate; and methoxy polyethylene glycol (meth)acrylate [the number of repetitions of $-OC_2H_4-$ is, for example, 2 to 9].

To appropriately increase the consumption rate of the coating film, the content of the structural unit derived from the monomer (b-2) in the copolymer is preferably greater than or equal to 1 mass %, more preferably greater than or equal to 2.5 mass %, and still more preferably greater than or equal to 10 mass % in 100 mass % of the copolymer. If the content of the structural unit (A) is excessively high for the purpose of increasing the consumption rate of the coating film, the long-term stability of the consumption rate of the coating film is not obtained.

The content of the structural unit derived from the monomer (b-2) in the copolymer is preferably less than or equal to 40 mass %, and more preferably less than or equal to 35 mass % in 100 mass % of the copolymer. If the content of the structural unit derived from the monomer (b-2) is greater than 40 mass %, the consumption rate of the coating film excessively increases, which may degrade the long-term antifouling property.

[2-3] Monomer (b-3)

Examples of the monomer (b-3) include (meth)acrylic acid alkyl esters having 1 to 20 carbon atoms in the ester moiety, such as methyl (meth)acrylate, ethyl (meth)acrylate, isopropyl (meth)acrylate, n-butyl (meth)acrylate, isobutyl (meth)acrylate, tert-butyl (meth)acrylate, n-hexyl (meth) acrylate, 2-ethylhexyl (meth)acrylate, octyl (meth)acrylate, lauryl (meth) acrylate, and stearyl (meth)acrylate; hydroxy group-containing (meth)acrylic acid alkyl esters having 1 to 20 carbon atoms in the ester moiety, such as 2-hydroxyethyl (meth)acrylate, 2-hydroxypropyl (meth)acrylate, 3-hydroxypropyl (meth)acrylate, 4-hydroxybutyl (meth)acrylate; (meth)acrylic acid cyclic hydrocarbon esters, such as phenyl (meth)acrylate, benzyl (meth)acrylate, cyclohexyl (meth) acrylate, methylcyclohexyl (meth)acrylate; polymerizable unsaturated esters other than (meth)acrylic acid esters, such as crotonic acid esters, maleic acid diesters, and itaconic acid diesters; polymerizable monomers having acidic groups other than free carboxy group, such as vinylsulfonic acid and vinylbenzene sulfonic acid; and other polymerizable vinyl compounds, such as (meth)acrylamide, (meth)acrylonitrile, styrene, a-methylstyrene, o-, m-, or p-methylstyrene, vinyl acetate, vinyl propionate, vinyl benzoate, vinyltoluene, divalent metal di(meth)acrylates (divalent metal can be copper or zinc), and divalent metal atom-containing vinyl monomers (divalent metal atom can be copper atom or zinc atom).

In (meth)acrylic acid alkyl esters and hydroxy group-containing (meth)acrylic acid alkyl esters, the number of carbon atoms in the ester moiety is preferably greater than or equal to 1 and less than or equal to 8, and more preferably greater than or equal to 1 and less than or equal to 6.

The content of the structural unit derived from the monomer (b-3) in the copolymer is controlled such that the content of the structural unit (B) is as described above. The content of the structural unit derived from the monomer (b-3) is normally greater than or equal to 20 mass % and less than or equal to 55 mass %, and preferably greater than or equal to 25 mass % and less than or equal to 50 mass %.

[3] Copolymer and Preparation of Copolymer

From the viewpoint of long-term stability in the consumption rate of the coating film, the acid value derived from free carboxy group in the copolymer is preferably greater than or equal to 0.1 KOHmg/g, and more preferably greater than or equal to 0.3 KOHmg/g.

The acid value derived from free carboxy group in the copolymer is preferably less than or equal to 60 KOHmg/g, more preferably less than or equal to 30 KOHmg/g, and still more preferably less than or equal to 20 KOHmg/g. If the acid value derived from free carboxy group is greater than 60 KOHmg/g, the antifouling coating composition containing the copolymer has low storage stability, and the antifouling coating composition tends to have high viscosity or become gelled during storage.

The acid value derived from free carboxy group in the copolymer is determined by neutralization titration using phenolphthalein as an indicator in accordance with JIS K 0070.

From the viewpoint of long-term stability in the consumption rate of the coating film, the copolymer preferably has an acid value derived from free carboxy group in the above-described range and includes a structural unit derived from the monomer (b-1) having a free carboxy group, and the copolymer more preferably has an acid value derived from free carboxy group in the above-described range and includes a structural unit derived from (meth)acrylic acid.

When the copolymer has an acid value derived from free carboxy group in the above-described range and includes a structural unit derived from (meth)acrylic acid, the content of the structural unit derived from (meth)acrylic acid in the copolymer is preferably greater than or equal to 0.02 mass % and more preferably greater than or equal to 0.05 mass % in 100 mass % of the copolymer from the viewpoint of long-term stability in the consumption rate of the coating film. The content of the structural unit derived from (meth) acrylic acid is preferably less than or equal to 8 mass %, more preferably less than or equal to 5 mass %, and still more preferably less than or equal to 2.5 mass % in 100 mass % of the copolymer. If the content of the structural unit derived from (meth)acrylic acid is greater than 8 mass %, the antifouling coating composition containing the copolymer has low storage stability, and the antifouling coating composition tends to have high viscosity or become gelled during storage.

Specific embodiments of the copolymer preferred from the viewpoint of, for example, the long-term stability in the consumption rate of the coating film and the long-term antifouling property of the coating film are, for example, as described below.

a) A copolymer contains 40 mass % or more and 80 mass % or less of the structural unit (A) and 20 mass % or more and 60 mass % or less of the structural unit (B) in 100 mass % of the copolymer, wherein the acid value derived from free carboxy group is greater than or equal to 0.1 KOHmg/g and less than or equal to 60 KOHmg/g.

In this copolymer, the acid value is preferably greater than or equal to 0.1 KOHmg/g and less than or equal to 30 KOHmg/g, and more preferably greater than or equal to 0.3 KOHmg/g and less than or equal to 20 KOHmg/g.

b) A copolymer contains 50 mass % or more and 65 mass % or less of the structural unit (A) and 35 mass % or more and 50 mass % or less of the structural unit (B) in 100 mass % of the copolymer, wherein the acid value derived from free carboxy group is greater than or equal to 0.1 KOHmg/g and less than or equal to 30 KOHmg/g.

c) A copolymer contains 40 mass % or more and 80 mass % or less of a structural unit derived from triisopropylsilyl (meth)acrylate and 20 mass % or more and 60 mass % or less of the structural unit (B) in 100 mass % of the copolymer, wherein the acid value derived from free carboxy group is greater than or equal to 0.1 KOHmg/g and less than or equal to 60 KOHmg/g.

In this copolymer, the acid value is preferably greater than or equal to 0.1 KOHmg/g and less than or equal to 30 KOHmg/g, and more preferably greater than or equal to 0.3 KOHmg/g and less than or equal to 20 KOHmg/g.

d) A copolymer contains 50 mass % or more and 65 mass % or less of a structural unit derived from triisopropylsilyl (meth)acrylate and 35 mass % or more and 50 mass % or less of the structural unit (B) in 100 mass % of the copolymer, wherein the acid value derived from free carboxy group is greater than or equal to 0.1 KOHmg/g and less than or equal to 30 KOHmg/g.

In this copolymer, the acid value is preferably greater than or equal to 0.3 KOHmg/g and less than or equal to 20 KOHmg/g.

e) A copolymer contains 40 mass % or more and 80 mass % or less of a structural unit derived from triisopropylsilyl (meth)acrylate, 0.02 mass % or more and 8 mass % or less of a structural unit derived from (meth)acrylic acid, and 12 mass % or more and 59.98 mass % or less of the structural unit (B) other than the structural unit derived from (meth)acrylic acid in 100 mass % of the copolymer.

In this copolymer, the acid value derived from free carboxy group is preferably greater than or equal to 0.1 KOHmg/g and less than or equal to 60 KOHmg/g, more preferably greater than or equal to 0.1 KOHmg/g and less than or equal to 30 KOHmg/g, and still more preferably greater than or equal to 0.3 KOHmg/g and less than or equal to 20 KOHmg/g.

f) A copolymer contains 50 mass % or more and 65 mass % or less of a structural unit derived from triisopropylsilyl (meth)acrylate, 0.02 mass % or more and 5 mass % or less of a structural unit derived from (meth)acrylic acid, and 30 mass % or more and 49.98 mass % or less of the structural unit (B) other than the structural unit derived from (meth) acrylic acid in 100 mass % of the copolymer.

In this copolymer, the acid value derived from free carboxy group is preferably greater than or equal to 0.1 KOHmg/g and less than or equal to 60 KOHmg/g, more preferably greater than or equal to 0.1 KOHmg/g and less than or equal to 30 KOHmg/g, and still more preferably greater than or equal to 0.3 KOHmg/g and less than or equal to 20 KOHmg/g.

g) A copolymer contains 50 mass % or more and 65 mass % or less of a structural unit derived from triisopropylsilyl (meth)acrylate, 0.05 mass % or more and 2.5 mass % or less of a structural unit derived from (meth)acrylic acid, and 32.5 mass % or more and 49.95 mass % or less of the structural unit (B) other than the structural unit derived from (meth) acrylic acid in 100 mass % of the copolymer.

In this copolymer, the acid value derived from free carboxy group is preferably greater than or equal to 0.1 KOHmg/g and less than or equal to 60 KOHmg/g, more preferably greater than or equal to 0.1 KOHmg/g and less than or equal to 30 KOHmg/g, and still more preferably greater than or equal to 0.3 KOHmg/g and less than or equal to 20 KOHmg/g.

The weight-average molecular weight (Mw) of the copolymer is normally greater than or equal to 2000 and less than or equal to 300000, preferably greater than or equal to 5000 and less than or equal to 100000, and more preferably greater than or equal to 10000 and less than or equal to 80000. When the Mw of the copolymer is greater than or equal to 2000, the coating film formed of the antifouling coating composition containing the copolymer tends to exhibit antifouling performance. When the Mw is less than or equal to 300000, the copolymer tends to be uniformly dispersed in the antifouling coating composition. The weight-average molecular weight (Mw) as used herein refers to a weight-average molecular weight based on polystyrene standard determined by gel permeation chromatography (GPC).

The copolymer can be prepared by radical polymerization. For example, the copolymer can be prepared by subjecting a monomer composition to a thermal reaction in the presence of a radical polymerization initiator.

Examples of the radical polymerization initiator include 2,2'-azobis(isobutyronitrile), 2,2'-azobis(2,4-dimethylvaleronitrile), 2,2'-azobis(2-methylbutyronitrile), benzoyl peroxide, cumene hydroperoxide, lauryl peroxide, di-tert-butyl peroxide, and tert-butyl peroxy-2-ethylhexanoate.

The polymerization method may be, for example, a solution polymerization method performed in an organic solvent, an emulsion polymerization method, and a suspension polymerization method. However, a solution polymerization method using an organic solvent, such as toluene, xylene, methyl isobutyl ketone, and n-butyl acetate, is advantageous from the viewpoint of copolymer productivity and performance.

The copolymer prepared by radical polymerization is normally a random copolymer.

The copolymer is preferably a (meth)acrylic copolymer containing preferably 50 mass % or more, more preferably 60 mass % or more, still more preferably 70 mass % or more, yet still more preferably 80 mass % or more of the structural unit derived from a (meth)acrylic monomer. The (meth) acrylic monomer refers to, for example, (meth)acrylic acid and (meth)acrylic acid ester.

<Antifouling Coating Composition>

The antifouling coating composition according to the present invention (hereinafter also referred to as an "antifouling coating composition") contains the copolymer according to the present invention. Preferably, the antifouling coating composition further contains an antifouling agent.

The antifouling coating composition according to the present invention can exhibit good storage stability because it contains the copolymer.

The content of the copolymer in the antifouling coating composition is, for example, greater than or equal to 30 mass % and less than or equal to 97 mass %, and preferably greater than or equal to 35 mass % and less than or equal to 95 mass % in 100 mass % of the solid content of the antifouling coating composition. If the content of the copolymer is less than 30 mass %, the coating film has inadequate antifouling performance. If the content of the copolymer is greater than 97 mass %, the coating film has low flexibility and tends to be cracked.

The solid content of the antifouling coating composition refers to the total amount of components other than the solvent contained in the antifouling coating composition.

The antifouling coating composition preferably contains an antifouling agent.

The antifouling agent is not limited and may be any known antifouling agent. Examples of the antifouling agent include inorganic compounds, metal-containing organic compounds, and metal-free organic compounds.

Specific examples of the antifouling agent include cuprous oxide; manganese ethylene-bis-dithiocarbamate; zinc dimethyldithiocarbamate; 2-methylthio-4-t-butylamino-6-cyclopropylamino-s-triazine; 2,4,5,6-tetrachloroisophthalonitrile; N,N-dimethyl dichlorophenyl urea; zinc ethylene-bis-dithiocarbamate; copper rhodanide (copper(I) thiocyanate); 4,5-dichloro-2-n-octyl-4-isothiazolin-3-one (4,5-dichloro-2-n-octyl-3(2H) isothiazolone); N-(fluorodichloromethylthio)phthalimide; N,N'-dimethyl-N'-phenyl-(N-fluorodichloromethylthio)sulfamide; metal salts, such as 2-pyridinethiol-1-oxide zinc salt (zinc pyrithione) and copper salt (copper pyrithione); tetramethylthiuram disulfide; 2,4,6-trichlorophenylmaleimide; 2,3,5,6-tetrachloro-4-(methylsulfonyl)pyridine; 3-iodo-2-propyl butylcarbamate; diiodomethyl-para-trisulfone; phenyl(bispyridyl)bismuth dichloride; 2-(4-thiazolyl)-benzimidazole; triphenylboron pyridine salt; stearylamine-triphenylboron; laurylamine-triphenylboron; bisdimethyl dithiocarbamoyl zinc ethylene bisdithiocarbamate; 1,1-dichloro-N-[(dimethylamino)sulfonyl]-1-fluoro-N-phenylmethanesulfenamide; 1,1-dichloro-N-[(dimethylamino)sulfonyl]-1-fluoro-N-(4-methylphenyl) methanesulfenamide; N'-(3,4-dichlorophenyl)-N, N'-dimethylurea; N'-tert-butyl-N-cyclopropyl-6-(methylthio)-1,3,5-triazine-2,4-diamine; and 4-bromo-2-(4-chlorophenyl)-5-(trifluoromethyl)-1H-pyrrole-3-carbonitrile.

One kind of the antifouling agent may be used or two or more kinds thereof may be used.

The content of the antifouling agent is normally greater than or equal to 1 part by mass and less than or equal to 200 parts by mass, and more preferably greater than or equal to 5 parts by mass and less than or equal to 150 parts by mass relative to 100 parts by mass of the copolymer.

If the content of the antifouling agent is excessively small, the coating film tends to fail to exhibit antifouling performance. If the content of the antifouling agent is excessively large, the coating film may undergo defects such as cracks and peeling.

The antifouling coating composition may contain a component other than the antifouling agent.

Examples of other components include a binder resin other than the copolymer according to the present invention, a coating film consumption controlling agent, a pigment, a plasticizer, a solvent, a water binder, an anti-sagging agent, an anti-flooding agent, an anti-settling agent, a defoamer, an ultraviolet absorber, a surface conditioner, a viscosity modifier, a leveling agent, and a dispersant (e.g., colloidal silica).

Examples of the binder resin other than the copolymer according to the present invention include (meth)acrylic resin (e.g., poly (meth)acrylic acid ester), rosin, hydrogenated rosin, zinc rosinate, chlorinated paraffin, chlorinated polyolefin, polyvinyl ethyl ether, polypropylene sebacate, alkyd resin, partially-hydrogenated terphenyl, polyvinyl acetate, polyether polyol, polyester resin, vinyl chloride-based resin, and cumarone resin.

One kind of these other binder resins may be used or two or more kinds of other binder resins may be used. These other binder resins may be used as a coating film consumption controlling agent.

Examples of the coating film consumption controlling agent include examples listed as other binder resins, and Vaseline, liquid paraffin, wax, fat and oil, fatty acid, and silicone oil.

One kind of the coating film consumption controlling agent may be used or two or more kinds thereof may be used.

Examples of the pigment include extender pigments, such as precipitated barium, talc, clay, chalk, silica white, alumina white, bentonite, calcium carbonate, magnesium carbonate, silicic acid, silicic acid salts, aluminum oxide hydrate, and calcium sulfate; and color pigments, such as titanium oxide, zirconium oxide, basic lead sulfate, tin oxide, carbon black, white lead, graphite, zinc sulfide, zinc oxide (flowers of zinc), chrome oxide, yellow nickel titanium, yellow chromium titanium, yellow iron oxide, red iron oxide, black iron oxide, azo-based red and yellow pigments, chrome yellow, phthalocyanine green, phthalocyanine blue, ultramarine blue, and quinacridone.

One kind of the pigment may be used or two or more kinds thereof may be used.

Examples of the plasticizer include phthalic acid ester plasticizers, such as dioctyl phthalate (DOP), dimethyl phthalate, dicyclohexyl phthalate, and diisodecyl phthalate (DIDP); aliphatic dibasic acid ester plasticizers, such as isobutyl adipate and dibutyl sebacate; glycol ester plasticizers, such as diethylene glycol dibenzoate and pentaerythritol alkyl esters; phosphoric acid ester plasticizers, such as tricresyl phosphoric acid (tricresyl phosphate), triaryl phosphoric acid (triaryl phosphate), and trichloroethyl phosphoric acid; epoxy plasticizers, such as epoxy soybean oil, and octyl epoxy stearate; organic tin plasticizers, such as dioctyltin laurate and dibutyltin laurate; and trioctyl trimellitate, and triacetylene.

One kind of the plasticizer may be used or two or more kinds thereof may be used.

Examples of the solvent include hydrocarbons, such as toluene, xylene, ethylbenzene, cyclopentane, octane, heptane, cyclohexane, and white spirit; ethers, such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, and diethylene glycol monoethyl ether; esters, such as butyl acetate, propyl acetate, benzyl acetate, ethylene glycol monomethyl ether acetate, and ethylene glycol monoethyl ether acetate; ketones, such as ethyl isobutyl ketone and methyl isobutyl ketone; and alcohols, such as n-butanol and propyl alcohol.

One kind of the solvent may be used or two or more kinds thereof may be used.

The antifouling coating composition can be prepared by, for example, adding other components to the copolymer or a resin composition containing the copolymer (e.g., copolymer solution) as needed and mixing the mixture with a mixer, such as a ball mill, a pebble mill, a roll mill, a sand grinding mill, and Disper.

The antifouling coating film can be formed by applying the antifouling coating composition to the surface of a target object in accordance with an ordinary method and then removing the solvent by volatilization at ordinary temperature or with heating as needed.

The thickness of the antifouling coating film is, for example, greater than or equal to 50 μm and less than or equal to 500 μm, and preferably greater than or equal to 100 μm and less than or equal to 400 μm.

Examples of the method for applying the antifouling coating composition include, but are not limited to, dipping, spraying, brush coating, roller, electrostatic coating, and electrodeposition coating.

Examples of the target object include, but are not limited to, ships; various fishing nets including those for aquaculture, and other fishing gears; port facilities; booms; water intake facilities, such as power plants; piping, such as cooling water conduits; bridges; buoys; industrial water facilities; and underwater structures, such as submarine bases.

The antifouling coating film formed by using the antifouling coating composition of the present invention may have good long-term stability and good long-term antifouling property.

The coated surface of the target object may be pretreated as needed, or may have a composite coating film including an undercoat containing other paint such as an anti-corrosive paint (corrosion resistant paint) on the target object and an antifouling coating film formed of the antifouling coating composition of the present invention on the undercoat.

EXAMPLES

The present invention will be described below in more detail by way of Examples and Comparative Examples, but the present invention is not limited to these Examples.

Example 1: Preparation of Copolymer

To a four-necked flask equipped with a thermometer, a condenser, a stirrer, a dropping funnel, a nitrogen inlet tube, and a temperature controller, 80 g of xylene was added as a solvent and maintained at 95±3° C. A mixture containing the monomers shown in Table 1 in the amounts shown in Table 1 (the amounts of the monomers shown in Table 1 are expressed in "g") and 1.2 g of tert-butyl peroxy-2-ethylhexanoate, which was a radical polymerization initiator, was placed in the dropping funnel and added dropwise to the four-necked flask over four hours. The reaction mixture was then incubated for four hours, and 20 g of xylene was added to the mixture. The resulting mixture was cooled to provide a copolymer solution 1 containing a copolymer 1.

The solid content of the copolymer solution 1, and the weight-average molecular weight Mw and the acid value of the copolymer 1 were measured. The infrared absorption spectrum of the copolymer 1 was measured to confirm the presence of a free carboxy group. The results are shown in Table 1. The measurement methods are as described below. The same measurement methods were used for the copolymer solutions and the copolymers prepared in other Examples and Comparative Examples.

(Solid Content of Copolymer Solution)

The mass W2 (g) of the solid (copolymer) obtained by heating W1 (g) of the copolymer solution at 105° C. for three hours was measured, and the solid content was determined on the basis of the following formula:

$$\text{Solid content of copolymer solution} = W2/W1 (\text{mass \%}).$$

(Weight-Average Molecular Weight Mw of Copolymer)

The weight-average molecular weight Mw of the copolymer is a weight-average molecular weight based on polystyrene standard determined by GPC. The measurement conditions were as described below.

Apparatus: "HLC-8220GPC" available from Tosoh Corporation

Column: TSKgelSuperHZM-M×2 columns

Eluent: tetrahydrofuran

Measurement temperature: 35° C.

Detector: RI (Acid Value of Copolymer)

The copolymer solution (1 part by mass) was diluted with 10 parts by mass of tetrahydrofuran, and the solid was precipitated from the diluted solution by addition of 655 parts by mass of hexane under stirring with a magnetic stirrer. The solid was dried under reduced pressure to provide a test sample. The acid value of the test sample was determined by neutralization titration using phenolphthalein as an indicator in accordance with JIS K 0070.

(Confirmation of Presence of Free Carboxy Group)

For the same test sample used to measure the acid value, the presence of a free carboxy group was confirmed on the basis of the presence of an absorption peak at 1625 cm$^{-1}$, which was a characteristic absorption peak of the free carboxy group, in an infrared absorption spectrum measured (by KBr method) under the following measurement conditions. In Tables below, the case where a free carboxy group was present was rated A, and the case where a free carboxy group was absent was rated B.

Apparatus: "IRF-5200" available from JASCO Corporation

Measurement temperature: room temperature

Example 2: Preparation of Copolymer

A copolymer solution 2 containing a copolymer 2 was produced by performing a polymerization reaction in the same manner as in Example 1, except that a mixture containing the monomers shown in Table 1 in the amounts shown in Table 1 and 1.5 g of 2,2'-azobis(isobutyronitrile), which was a radical polymerization initiator, was used.

Example 3: Preparation of Copolymer

A copolymer solution 3 containing a copolymer 3 was produced by performing a polymerization reaction in the same manner as in Example 1, except that a mixture containing the monomers shown in Table 1 in the amounts shown in Table 1 and 1.5 g of tert-butyl peroxy-2-ethylhexanoate, which was a radical polymerization initiator, was used.

Example 4: Preparation of Copolymer

A copolymer solution 4 containing a copolymer 4 was produced by performing a polymerization reaction in the same manner as in Example 1, except that a mixture containing the monomers shown in Table 1 in the amounts shown in Table 1 and 1.5 g of tert-butyl peroxy-2-ethylhexanoate, which was a radical polymerization initiator, was used.

Example 5: Preparation of Copolymer

A copolymer solution 5 containing a copolymer 5 was produced by performing a polymerization reaction in the same manner as in Example 1, except that a mixture containing the monomers shown in Table 1 in the amounts shown in Table 1 and 1.2 g of tert-butyl peroxy-2-ethylhexanoate, which was a radical polymerization initiator, was used.

Example 6: Preparation of Copolymer

A copolymer solution 6 containing a copolymer 6 was produced by performing a polymerization reaction in the same manner as in Example 1, except that a mixture containing the monomers shown in Table 1 in the amounts shown in Table 1 and 1.2 g of tert-butyl peroxy-2-ethylhexanoate, which was a radical polymerization initiator, was used.

Example 7: Preparation of Copolymer

A copolymer solution 7 containing a copolymer 7 was produced by performing a polymerization reaction in the same manner as in Example 1, except that a mixture containing the monomers shown in Table 1 in the amounts shown in Table 1 and 0.9 g of tert-butyl peroxy-2-ethylhexanoate, which was a radical polymerization initiator, was used.

Example 8: Preparation of Copolymer

A copolymer solution 8 containing a copolymer 8 was produced by performing a polymerization reaction in the same manner as in Example 1, except that a mixture containing the monomers shown in Table 1 in the amounts shown in Table 1 and 1.2 g of 2,2'-azobis(isobutyronitrile), which was a radical polymerization initiator, was used, and the temperature of the polymerization reaction was set at 100±3° C.

Example 9: Preparation of Copolymer

A copolymer solution 9 containing a copolymer 9 was produced by performing a polymerization reaction in the same manner as in Example 1, except that a mixture containing the monomers shown in Table 1 in the amounts shown in Table 1 and 1.2 g of tert-butyl peroxy-2-ethylhexanoate, which was a radical polymerization initiator, was used, and the temperature of the polymerization reaction was set at 100±3° C.

Example 10: Preparation of Copolymer

A copolymer solution 10 containing a copolymer 10 was produced by performing a polymerization reaction in the same manner as in Example 1, except that a mixture containing the monomers shown in Table 1 in the amounts shown in Table 1 and 1.2 g of tert-butyl peroxy-2-ethylhexanoate, which was a radical polymerization initiator, was used.

Example 11: Preparation of Copolymer

A copolymer solution 11 containing a copolymer 11 was produced by performing a polymerization reaction in the same manner as in Example 1, except that a mixture containing the monomers shown in Table 1 in the amounts shown in Table 1 and 1.5 g of 2,2'-azobis(isobutyronitrile), which was a radical polymerization initiator, was used.

Example 12: Preparation of Copolymer

A copolymer solution 12 containing a copolymer 12 was produced by performing a polymerization reaction in the same manner as in Example 1, except that a mixture containing the monomers shown in Table 1 in the amounts shown in Table 1 and 1.0 g of tert-butyl peroxy-2-ethylhexanoate, which was a radical polymerization initiator, was used.

Example 13: Preparation of Copolymer

A copolymer solution 13 containing a copolymer 13 was produced by performing a polymerization reaction in the same manner as in Example 1, except that a mixture containing the monomers shown in Table 1 in the amounts shown in Table 1 and 1.2 g of 2,2'-azobis(isobutyronitrile), which was a radical polymerization initiator, was used.

Example 14: Preparation of Copolymer

A copolymer solution 14 containing a copolymer 14 was produced by performing a polymerization reaction in the same manner as in Example 1, except that a mixture containing the monomers shown in Table 2 in the amounts shown in Table 2 and 1.2 g of tert-butyl peroxy-2-ethylhexanoate, which was a radical polymerization initiator, was used.

Example 15: Preparation of Copolymer

A copolymer solution 15 containing a copolymer 15 was produced by performing a polymerization reaction in the same manner as in Example 1, except that a mixture containing the monomers shown in Table 2 in the amounts shown in Table 2 and 1.2 g of tert-butyl peroxy-2-ethylhexanoate, which was a radical polymerization initiator, was used, and the temperature of the polymerization reaction was set at 90±3° C.

Example 16: Preparation of Copolymer

A copolymer solution 16 containing a copolymer 16 was produced by performing a polymerization reaction in the same manner as in Example 1, except that a mixture containing the monomers shown in Table 2 in the amounts shown in Table 2 and 1.2 g of tert-butyl peroxy-2-ethylhexanoate, which was a radical polymerization initiator, was used.

Example 17: Preparation of Copolymer

A copolymer solution 17 containing a copolymer 17 was produced by performing a polymerization reaction in the same manner as in Example 1, except that a mixture containing the monomers shown in Table 2 in the amounts shown in Table 2 and 1.5 g of 2,2'-azobis(isobutyronitrile), which was a radical polymerization initiator, was used.

Example 18: Preparation of Copolymer

A copolymer solution 18 containing a copolymer 18 was produced by performing a polymerization reaction in the same manner as in Example 1, except that a mixture containing the monomers shown in Table 2 in the amounts shown in Table 2 and 1.0 g of tert-butyl peroxy-2-ethylhexanoate, which was a radical polymerization initiator, was used, and the temperature of the polymerization reaction was set at 90±4° C.

Example 19: Preparation of Copolymer

A copolymer solution 19 containing a copolymer 19 was produced by performing a polymerization reaction in the same manner as in Example 1, except that a mixture containing the monomers shown in Table 2 in the amounts shown in Table 2 and 1.1 g of tert-butyl peroxy-2-ethylhexanoate, which was a radical polymerization initiator, was used.

Example 20: Preparation of Copolymer

A copolymer solution 20 containing a copolymer 20 was produced by performing a polymerization reaction in the same manner as in Example 1, except that a mixture containing the monomers shown in Table 2 in the amounts shown in Table 2 and 1.1 g of 2,2'-azobis(isobutyronitrile), which was a radical polymerization initiator, was used.

Example 21: Preparation of Copolymer

A copolymer solution 21 containing a copolymer 21 was produced by performing a polymerization reaction in the same manner as in Example 1, except that a mixture containing the monomers shown in Table 2 in the amounts shown in Table 2 and 1.1 g of 2,2'-azobis(isobutyronitrile), which was a radical polymerization initiator, was used.

Example 22: Preparation of Copolymer

A copolymer solution 22 containing a copolymer 22 was produced by performing a polymerization reaction in the same manner as in Example 1, except that a mixture containing the monomers shown in Table 2 in the amounts shown in Table 2 and 1.0 g of tert-butyl peroxy-2-ethylhexanoate, which was a radical polymerization initiator, was used.

Example 23: Preparation of Copolymer

A copolymer solution 23 containing a copolymer 23 was produced by performing a polymerization reaction in the same manner as in Example 1, except that a mixture containing the monomers shown in Table 2 in the amounts shown in Table 2 and 1.0 g of tert-butyl peroxy-2-ethylhexanoate, which was a radical polymerization initiator, was used.

Example 24: Preparation of Copolymer

A copolymer solution 24 containing a copolymer 24 was produced by performing a polymerization reaction in the same manner as in Example 1, except that a mixture containing the monomers shown in Table 2 in the amounts shown in Table 2 and 1.1 g of tert-butyl peroxy-2-ethylhexanoate, which was a radical polymerization initiator, was used.

Example 25: Preparation of Copolymer

To a four-necked flask equipped with a thermometer, a condenser, a stirrer, a dropping funnel, a nitrogen inlet tube, a decanter, and a temperature controller were added 100 g of xylene, which was a solvent, 100 g of the copolymer solution 9, 4.2 g of hydrogenated rosin (acid value: 155 KOHmg/g), and 2.3 g of copper acetate monohydrate. The mixture was allowed to react under reflux for seven hours while water and acetic acid were removed. After completion of the reaction, the concentration of the copolymer was adjusted to about 50 mass % by addition of xylene to provide a copolymer solution 25 containing a copolymer 25.

Comparative Example 1: Preparation of Copolymer

A copolymer solution H1 containing a copolymer H1 was produced by performing a polymerization reaction in the same manner as in Example 1, except that 70 g of xylene was used instead of 80 g of xylene as a solvent initially added to the flask, a mixture containing the monomers shown in Table 3 in the amounts shown in Table 3 and 0.9 g of tert-butyl peroxy-2-ethylhexanoate, which was a radical polymerization initiator, was used, the temperature of the polymerization reaction was set at 90±3° C., and the amount of xylene added after completion of the reaction was 30 g.

Comparative Example 2: Preparation of Copolymer

A copolymer solution H2 containing a copolymer H2 was produced by performing a polymerization reaction in the same manner as in Example 1, except that a mixture containing the monomers shown in Table 3 in the amounts shown in Table 3 and 1.2 g of 2,2'-azobis(isobutyronitrile), which was a radical polymerization initiator, was used.

Comparative Example 3: Preparation of Copolymer

A copolymer solution H3 containing a copolymer H3 was produced by performing a polymerization reaction in the same manner as in Example 1, except that a mixture containing the monomers shown in Table 3 in the amounts shown in Table 3 and 1.2 g of 2,2'-azobis(isobutyronitrile), which was a radical polymerization initiator, was used.

Comparative Example 4: Preparation of Copolymer

A copolymer solution H4 containing a copolymer H4 was produced by performing a polymerization reaction in the same manner as in Example 1, except that a mixture containing the monomers shown in Table 3 in the amounts shown in Table 3 and 1.2 g of 2,2'-azobis(isobutyronitrile), which was a radical polymerization initiator, was used.

Comparative Example 5: Preparation of Copolymer

A copolymer solution H5 containing a copolymer H5 was produced in the same manner as in Example 25, except that the amount of hydrogenated rosin (acid value: 155 KOHmg/g) used was 8.4 g, and the amount of copper acetate monohydrate was 4.6 g.

In the same manner as in Example 1, the solid content of the copolymer solution, and the weight-average molecular weight Mw and the acid value of the copolymer were measured, and the presence of a free carboxy group in the copolymer was confirmed for Examples 2 to 25 and Comparative Examples 1 to 5. The results are shown in Tables 1 to 3.

TABLE 1

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Copolymer No. | | 1 | 2 | 3 | 4 | 5 | 6 | 7 | 8 | 9 | 10 | 11 | 12 | 13 |
| Monomer | (1) MMA | 21 | 29.8 | 20.8 | 35 | 11 | 10 | 15 | 10 | 20 | 15 | 15 | 12.2 | 10 |
| | (2) EA | 5 | | | | | | | | | | | | |
| | (3) n-BA | | | 3 | | 6 | 4 | 4 | 8 | 6 | 4 | 5 | 2.8 | 4.5 |
| | (4) t-BA | 3.98 | 2 | | | | | | | | | | 2 | 1 |
| | (5) i-BA | | | | 5 | 3 | | | | | | 4 | | |
| | (6) TIPSA | 50 | 60 | 70 | | | | | | | | | | |
| | (7) TIPSMA | | | | 50 | 55 | 60 | 65 | 65 | 65 | 60 | 70 | 75 | 80 |
| | (8) TIPSIAM | | | | | | | | | | | | | |
| | (9) DIPPSM | | | | | | | | | | | | | |
| | (10) DIPIBSM | | | | | | | | | | | | | |
| | (11) AA | 0.02 | 0.2 | 0.2 | 7 | 3 | 2 | 1 | | | | | | |
| | (12) MAA | | | | | | | | 2 | 4 | 6 | 1 | 3 | 0.5 |
| | (13) MA | | | | | | | | | | | | | |
| | (14) ST | | | | 2 | | | | | | | | | |
| | (15) M-90G | 5 | | | | | | | | | | | | |
| | (16) M-40G | | | | 3 | | | | | 3 | | | | |
| | (17) MEA | 15 | | 4 | | | | | 4 | 2 | 5 | | | |
| | (18) MEMA | | 5 | | | 25 | 24 | 15 | 11 | | 10 | 5 | 5 | 4 |
| | Total | 100 | 100 | 100 | 100 | 100 | 100 | 100 | 100 | 100 | 100 | 100 | 100 | 100 |
| Solvent | Xylene | 100 | 100 | 100 | 100 | 100 | 100 | 100 | 100 | 100 | 100 | 100 | 100 | 100 |
| | n-Butanol | | | | | | | | | | | | | |
| Solid content (mass %) of copolymer solution | | 50.1 | 49.2 | 49.8 | 49.8 | 49.1 | 49.1 | 50.1 | 50.0 | 50.3 | 50.4 | 50.4 | 49.6 | 49.5 |
| Mw ($\times 10^4$) of copolymer | | 3.4 | 4.2 | 3.6 | 3.8 | 3.7 | 3.9 | 3.9 | 3.1 | 3.1 | 3.6 | 3.9 | 3.7 | 4.1 |
| Acid value (KOHmg/g) of copolymer | | 0.16 | 1.56 | 1.56 | 54.6 | 23.4 | 15.6 | 7.79 | 13.1 | 26.1 | 39.1 | 6.52 | 19.8 | 3.26 |
| Presence of free carboxy group | | A | A | A | A | A | A | A | A | A | A | A | A | A |

TABLE 2

| | | Examples | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Copolymer No. | | 14 | 15 | 16 | 17 | 18 | 19 | 20 | 21 | 22 | 23 | 24 | 25 |
| Monomer | (1) MMA | 15 | 5 | 10 | 10 | 5 | 20 | 15 | 12 | 15 | 20 | 25 | |
| | (2) EA | | | | | | | | | | 5 | | |
| | (3) n-BA | 4.5 | 4.8 | 9.8 | 6.9 | 9.8 | 5 | | 4 | 5 | | 8 | |
| | (4) t-BA | | | | 1 | | | | | | | | |
| | (5) i-BA | | | | | | | | 5 | | 10 | 2 | |
| | (6) TIPSA | | 50 | | | | 50 | 55 | 60 | 45 | | | |
| | (7) TIPSMA | 40 | | 50 | 50 | 55 | | | | | 55 | 50 | |
| | (8) TIPSIAM | | | | | | | | | 7 | | | |
| | (9) DIPPSM | | | | | | | | | | 5 | | |
| | (10) DIPIBSM | | | | | | | | | | | 10 | |
| | (11) AA | | | | | | 0.5 | | 1 | | | | |
| | (12) MAA | 0.5 | 0.2 | 0.2 | 0.1 | 0.2 | | 0.2 | 2 | | 1 | 3 | |
| | (13) MA | | | | | | | | | 1 | | | |
| | (14) ST | | | | | | | | | 6 | | | |
| | (15) M-90G | | | | | | | | | | 2 | | |
| | (16) M-40G | | | | | | | 2 | 5 | | | | |

TABLE 2-continued

| | | Examples | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| | (17) MEA | | | | | | | 4.8 | | | 2 | | |
| | (18) MEMA | 40 | 40 | 30 | 32 | 30 | 24.5 | 20 | 20 | 15 | | 2 | |
| | Total | 100 | 100 | 100 | 100 | 100 | 100 | 100 | 100 | 100 | 100 | 100 | |
| Solvent | Xylene | 100 | 100 | 100 | 100 | 100 | 100 | 100 | 100 | 100 | 100 | 100 | |
| | n-Butanol | | | | | | | | | | | | |
| Solid content (mass %) of copolymer solution | | 50.1 | 50.3 | 49.9 | 50.0 | 50.4 | 49.5 | 50.0 | 49.7 | 50.3 | 50.0 | 49.9 | 48.8 |
| Mw (×10$^4$) of copolymer | | 3.7 | 4.3 | 3.9 | 4.0 | 4.4 | 3.9 | 3.8 | 3.9 | 5.1 | 5.3 | 5.1 | — |
| Acid value (KOHmg/g) of copolymer | | 3.30 | 1.30 | 1.30 | 0.65 | 1.30 | 3.90 | 1.30 | 13.0 | 21.2 | 6.52 | 19.6 | 23.7 |
| Presence of free carboxy group | | A | A | A | A | A | A | A | A | A | A | A | A |

TABLE 3

| | | Comparative Examples | | | | |
|---|---|---|---|---|---|---|
| | | 1 | 2 | 3 | 4 | 5 |
| Copolymer No. | | H1 | H2 | H3 | H4 | H5 |
| Monomer | (1) MMA | 10 | 10 | 30 | 25 | |
| | (2) EA | | | | | |
| | (3) n-BA | 8 | 10 | | 15 | |
| | (4) t-BA | | | 10 | | |
| | (5) i-BA | | | | | |
| | (6) TIPSA | | | 55 | 30 | |
| | (7) TIPSMA | 55 | 50 | | | |
| | (8) TIPSIAM | | | | | |
| | (9) DIPPSM | | | | | |
| | (10) DIPIBSM | | | | | |
| | (11) AA | 6 | | | | |
| | (12) MAA | 4 | | | | |
| | (13) MA | | | | | |
| | (14) ST | 2 | | | | |
| | (15) M-90G | | | | | |
| | (16) M-40G | | | 5 | | |
| | (17) MEA | | | | | |
| | (18) MEMA | 15 | 30 | | 30 | |
| | Total | 100 | 100 | 100 | 100 | |
| Solvent | Xylene | 100 | 100 | 100 | 100 | |
| | n-Butanol | | | | | |
| Solid content (mass %) of copolymer solution | | 49.9 | 49.4 | 50.1 | 50.3 | 49.8 |
| Mw (×10$^4$) of copolymer | | 5.5 | 3.9 | 3.7 | 3.7 | — |
| Acid value (KOHmg/g) of copolymer | | 72.9 | <0.1 | <0.1 | <0.1 | 21.2 |
| Presence of free carboxy group | | A | B | B | B | B |

The details of the abbreviated expressions in Tables 1 to 3 are as described below.
(1) MMA: methyl methacrylate
(2) EA: ethyl acrylate
(3) n-BA: n-butyl acrylate
(4) t-BA: tert-butyl acrylate
(5) i-BA: isobutyl acrylate
(6) TIPSA: triisopropylsilyl acrylate
(7) TIPSMA: triisopropylsilyl methacrylate
(8) TIPSIAM: triisopropylsilyl isoamyl maleate
(9) DIPPSM: diisopropylphenylsilyl methacrylate
(10) DIPIBSM: diisopropyl-isobutyl methacrylate
(11) AA: acrylic acid
(12) MAA: methacrylic acid
(13) MA: maleic acid
(14) ST: styrene
(15) M-90G: methoxy polyethylene glycol methacrylate (the number of repetitions of oxyethylene chain=9)
(16) M-40G: methoxy polyethylene glycol methacrylate (the number of repetitions of oxyethylene chain=4)
(17) MEA: 2-methoxyethyl acrylate
(18) MEMA: 2-methoxyethyl methacrylate Examples 26 to 55, Comparative Examples 6 to 11>

(1) Preparation of Antifouling Paint Composition

An antifouling coating composition was prepared by mixing and dispersing any one of the copolymer solutions produced in Examples 1 to 25 and Comparative Examples 1 to 5 and other components shown in Tables 4 to 6 with Disper (2000 rpm) in accordance with the formulations (parts by mass) in Tables 4 to 6. The amount (parts by mass) of each component in Tables 4 to 6 is based on the solid content.

(2) Evaluation of Consumption Rate of Coating Film

The obtained antifouling coating composition was applied to a blasted plate previously coated with an anti-corrosive paint such that the dry coating thickness was 300 μm. The antifouling coating composition was left to stand in a room for two days and two nights for drying to provide a test plate having an antifouling coating film.

This test plate was subjected to a coating film consumption test involving attaching the test plate to the side surface of a cylinder 750 mm in diameter and 1200 mm in length and continuously rotating the test plate at a circumferential speed of 15 knots in sea water for days and nights to determine changes in coating film consumption amount (cumulative decrement [μm] in coating film thickness) of the test plate over time.

The value X in the row of "1st year" in Tables 4 to 6 is a value obtained by dividing, by 12, the decrement in coating film thickness [μm] for a period from the start of the test to the elapse of 12 months and means a decrement in coating film thickness per month in this period (1st year).

The value Y in the row of "2nd year" in Tables 4 to 6 is a value obtained by dividing, by 12, the decrement in coating film thickness [μm] for a period from the elapse of 12 months to the elapse of 24 months after the start of the test and means a decrement in coating film thickness per month in this period (2nd year).

The value Z in the row of "3rd year" in Tables 4 to 6 is a value obtained by dividing, by 12, the decrement in coating film thickness [μm] for a period from the elapse of 24 months to the elapse of 36 months after the start of the test and means a decrement in coating film thickness per month in this period (3rd year).

The value (Z/Y) obtained by dividing Z by Y is also shown in Tables 4 to 6.

(3) Evaluation of Antifouling Property of Coating Film

The obtained antifouling coating composition was applied to a blasted plate previously coated with an anti-corrosive paint such that the dry coating thickness was 300 μm. The antifouling coating composition was dried at room temperature for seven days to provide a test plate having an antifouling coating film. The obtained test plate was subjected to an organism attachment test in which the test plate was immersed at a raft in Aioi Bay, Ako-shi, Hyogo prefecture, Japan, and evaluated for the antifouling property of the coating film. The results are shown in Tables 4 to 6.

The years in Tables indicate the raft immersion periods. The values in Tables indicate the proportion (%) of the organism attachment area in the coating film area.

(4) Evaluation of Storage Stability of Antifouling Coating Composition

A storage stability test in which 180 cc of an antifouling coating composition was placed in a 200-cc paint can and stored at 40° C. for three months was carried out. A difference in viscosity (unit: KU) of the antifouling coating composition at 25° C. before and after storage was determined by using a Stormer viscometer. The results are shown in Tables 4 to 6.

TABLE 4

| | | Examples | | | | | | | | | | | | | | |
|---|---|---|---|---|---|---|---|---|---|---|---|---|---|---|---|---|
| | | 26 | 27 | 28 | 29 | 30 | 31 | 32 | 33 | 34 | 35 | 36 | 37 | 38 | 39 | 40 |
| Copolymer solution No. | 1 | 30 | | | | | | | | | | | | | | |
| | 2 | | 30 | | | | | | | | | | | | | |
| | 3 | | | 30 | | | | | | | | | | | | |
| | 4 | | | | 30 | | | | | | | | | | | |
| | 5 | | | | | 25 | 30 | | | | | | | | | |
| | 6 | | | | | | | 30 | 25 | | | | | | | |
| | 7 | | | | | | | | | 30 | | | | | | |
| | 8 | | | | | | | | | | 30 | | | | | |
| | 9 | | | | | | | | | | | 30 | | | | |
| | 10 | | | | | | | | | | | | 30 | | | |
| | 11 | | | | | | | | | | | | | 30 | | |
| | 12 | | | | | | | | | | | | | | 30 | |
| | 13 | | | | | | | | | | | | | | | 30 |
| Antifouling agent | Cuprous oxide | 25 | 25 | 25 | 25 | 30 | 25 | 25 | 30 | 25 | 25 | 25 | 25 | 25 | 25 | 25 |
| | Antifouling agent A | | | | | 5 | | | 5 | | | | | | | |
| | Antifouling agent B | 5 | 5 | 5 | 5 | | 5 | 5 | | 5 | 5 | 5 | 5 | 5 | 5 | 5 |
| | Total antifouling agent content | 30 | 30 | 30 | 30 | 35 | 30 | 30 | 35 | 30 | 30 | 30 | 30 | 30 | 30 | 30 |
| Solvent | Xylene | 10 | 10 | 10 | 10 | 10 | 10 | 10 | 10 | 10 | 10 | 10 | 10 | 10 | 10 | 10 |
| | n-Butyl acetate | 2 | 2 | 2 | 2 | 2 | 2 | 2 | 2 | 2 | 2 | 2 | 2 | 2 | 2 | 2 |
| | Total solvent content | 12 | 12 | 12 | 12 | 12 | 12 | 12 | 12 | 12 | 12 | 12 | 12 | 12 | 12 | 12 |
| Other components | Colloidal silica | 1 | 1 | 1 | 1 | 1 | 1 | 1 | 1 | 1 | 1 | 1 | 1 | 1 | 1 | 1 |
| | Bengala | 1 | 1 | 1 | 1 | 1 | 1 | 1 | 1 | 1 | 1 | 1 | 1 | 1 | 1 | 1 |
| | Flowers of zinc | 4 | 4 | 4 | 4 | 3 | 4 | 4 | 3 | 4 | 4 | 4 | 4 | 4 | 4 | 4 |
| | Polyvinyl ethyl ether | 4 | 4 | 4 | 4 | | 4 | 4 | | 4 | 4 | 4 | 4 | 4 | 4 | 4 |
| | Chlorinated paraffin | | | | | 3 | | | 3 | | | | | | | |
| | Rosin | 18 | 18 | 18 | 18 | | 18 | 18 | | 18 | 18 | 18 | 18 | 18 | 18 | 18 |
| | Zinc rosinate | | | | | 20 | | | 20 | | | | | | | |
| Total | | 100 | 100 | 100 | 100 | 100 | 100 | 100 | 100 | 100 | 100 | 100 | 100 | 100 | 100 | 100 |
| Consumption rate | 1st year (X) | 3.8 | 4.4 | 5.3 | 4.3 | 4.4 | 4.5 | 5.3 | 5.1 | 5.1 | 5 | 4.8 | 5 | 5.3 | 5.7 | 5.9 |
| | 2nd year (Y) | 4.4 | 4.8 | 5.9 | 4.8 | 4.8 | 4.9 | 5.7 | 5.7 | 5.7 | 5.5 | 5.2 | 5.4 | 5.8 | 6.1 | 6.5 |
| | 3rd year (Z) | 6.7 | 6.1 | 9.5 | 5.4 | 5.2 | 5.5 | 7.1 | 6.8 | 8.7 | 8.3 | 8.1 | 6 | 9.2 | 10 | 12 |
| | Z/Y | 1.5 | 1.3 | 1.6 | 1.1 | 1.1 | 1.1 | 1.2 | 1.2 | 1.5 | 1.5 | 1.6 | 1.1 | 1.6 | 1.7 | 1.8 |
| Antifouling property | after 1 year | 0 | 0 | 0 | 0 | 0 | 0 | 0 | 0 | 0 | 0 | 0 | 0 | 0 | 0 | 0 |
| | after 2 years | 5 | 3 | 0 | 0 | 0 | 0 | 0 | 0 | 0 | 0 | 0 | 0 | 0 | 0 | 0 |
| | after 3 years | 10 | 5 | 3 | 2 | 0 | 0 | 0 | 0 | 0 | 0 | 0 | 0 | 0 | 0 | 0 |
| Storage stability | | <5 | <5 | <5 | 25 | 17 | 17 | 8 | 7 | 6 | 8 | 14 | 21 | 9 | 19 | 7 |

TABLE 5

| | | Examples | | | | | | | | | | |
|---|---|---|---|---|---|---|---|---|---|---|---|---|
| | | 41 | 42 | 43 | 44 | 45 | 46 | 47 | 48 | 49 | 50 | 51 |
| Copolymer solution No. | 14 | 30 | | | | | | | | | | |
| | 15 | | 30 | | | | | | | | | |
| | 16 | | | 25 | 30 | | | | | | | |
| | 17 | | | | | 25 | 30 | | | | | |
| | 18 | | | | | | | 25 | 30 | | | |
| | 19 | | | | | | | | | 30 | | |
| | 20 | | | | | | | | | | 30 | |
| | 21 | | | | | | | | | | | 30 |
| Antifouling agent | Cuprous oxide | 25 | 25 | 30 | 25 | 30 | 25 | 30 | 25 | 25 | 25 | 25 |
| | Antifouling agent A | | | 5 | | 5 | | 5 | | | | |
| | Antifouling agent B | 5 | 5 | | 5 | | 5 | | 5 | 5 | 5 | 5 |
| | Total antifouling agent content | 30 | 30 | 35 | 30 | 35 | 30 | 35 | 30 | 30 | 30 | 30 |
| Solvent | Xylene | 10 | 10 | 10 | 10 | 10 | 10 | 10 | 10 | 10 | 10 | 10 |
| | n-Butyl acetate | 2 | 2 | 2 | 2 | 2 | 2 | 2 | 2 | 2 | 2 | 2 |
| | Total solvent content | 12 | 12 | 12 | 12 | 12 | 12 | 12 | 12 | 12 | 12 | 12 |
| Other components | Colloidal silica | 1 | 1 | 1 | 1 | 1 | 1 | 1 | 1 | 1 | 1 | 1 |
| | Bengala | 1 | 1 | 1 | 1 | 1 | 1 | 1 | 1 | 1 | 1 | 1 |
| | Flowers of zinc | 4 | 4 | 3 | 4 | 3 | 4 | 3 | 4 | 4 | 4 | 4 |
| | Polyvinyl ethyl ether | 4 | 4 | | 4 | | 4 | | 4 | 4 | 4 | 4 |
| | Chlorinated paraffin | | | 3 | | 3 | | 3 | | | | |
| | Rosin | 18 | 18 | | 18 | | 18 | | 18 | 18 | 18 | 18 |
| | Zinc rosinate | | | 20 | | 20 | | 20 | | | | |
| Total | | 100 | 100 | 100 | 100 | 100 | 100 | 100 | 100 | 100 | 100 | 100 |
| Consumption rate | 1st year (X) | 4.5 | 5.3 | 3.6 | 3.9 | 3.7 | 3.8 | 4.3 | 4.4 | 4 | 4.3 | 4.7 |
| | 2nd year (Y) | 5.2 | 5.9 | 4.1 | 4.4 | 4.1 | 4.2 | 4.8 | 4.9 | 4.2 | 4.6 | 5.1 |
| | 3rd year (Z) | 8.7 | 9.7 | 4.5 | 5.1 | 4.8 | 5 | 5.8 | 6 | 4.9 | 6.1 | 6 |
| | Z/Y | 1.7 | 1.6 | 1.1 | 1.2 | 1.2 | 1.2 | 1.2 | 1.2 | 1.2 | 1.3 | 1.2 |
| Antifouling property | after 1 year | 0 | 0 | 0 | 0 | 0 | 0 | 0 | 0 | 0 | 0 | 0 |
| | after 2 years | 0 | 0 | 0 | 0 | 0 | 0 | 0 | 0 | 0 | 0 | 0 |
| | after 3 years | 7 | 4 | 0 | 0 | 0 | 0 | 0 | 0 | 0 | 0 | 0 |
| Storage stability | | 7 | 6 | 7 | 8 | 6 | <5 | 8 | 7 | 8 | 6 | 6 |

TABLE 6

| | | Examples | | | | Comparative Examples | | | | | |
|---|---|---|---|---|---|---|---|---|---|---|---|
| | | 52 | 53 | 54 | 55 | 6 | 7 | 8 | 9 | 10 | 11 |
| Copolymer solution No. | 22 | 30 | | | | | | | | | |
| | 23 | | 30 | | | | | | | | |
| | 24 | | | 30 | | | | | | | |
| | 25 | | | | 30 | | | | | | |
| | H1 | | | | | 30 | | | | | |
| | H2 | | | | | | 30 | 25 | | | |
| | H3 | | | | | | | | 30 | | |
| | H4 | | | | | | | | | 30 | |
| | H5 | | | | | | | | | | 30 |

TABLE 6-continued

|  |  | Examples | | | | Comparative Examples | | | | | |
|---|---|---|---|---|---|---|---|---|---|---|---|
|  |  | 52 | 53 | 54 | 55 | 6 | 7 | 8 | 9 | 10 | 11 |
| Antifouling agent | Cuprous oxide | 25 | 25 | 25 | 25 | 25 | 25 | 30 | 25 | 25 | 25 |
|  | Antifouling agent A |  |  |  |  |  |  |  | 5 |  |  |
|  | Antifouling agent B | 5 | 5 | 5 | 5 | 5 | 5 |  |  | 5 | 5 |
|  | Total antifouling agent content | 30 | 30 | 30 | 30 | 30 | 30 |  | 30 | 30 | 30 |
| Solvent | Xylene | 10 | 10 | 10 | 10 | 10 | 10 | 10 | 10 | 10 | 10 |
|  | n-Butyl acetate | 2 | 2 | 2 | 2 | 2 | 2 | 2 | 2 | 2 | 2 |
|  | Total solvent content | 12 | 12 | 12 | 12 | 12 | 12 | 12 | 12 | 12 | 12 |
| Other components | Colloidal silica | 1 | 1 | 1 | 1 | 1 | 1 | 1 | 1 | 1 | 1 |
|  | Bengala | 1 | 1 | 1 | 1 | 1 | 1 | 1 | 1 | 1 | 1 |
|  | Flowers of zinc | 4 | 4 | 4 | 4 | 4 | 4 | 3 | 4 | 4 | 4 |
|  | Polyvinyl ethyl ether | 4 | 4 | 4 | 4 | 4 | 4 |  | 4 | 4 | 4 |
|  | Chlorinated paraffin |  |  |  |  |  |  | 3 |  |  |  |
|  | Rosin | 18 | 18 | 18 | 18 | 18 | 18 |  | 18 | 18 | 18 |
|  | Zinc rosinate |  |  |  |  |  |  | 20 |  |  |  |
| Total |  | 100 | 100 | 100 | 100 | 100 | 100 | 100 | 100 | 100 | 100 |
| Consumption rate | 1st year (X) | 5.1 | 4.8 | 5.7 | 4.4 | 4.5 | 3.2 | 3.1 | 3.5 | 2.4 | 4 |
|  | 2nd year (Y) | 6.4 | 5.7 | 6.8 | 5.4 | 5.8 | 4.8 | 4.4 | 5 | 3.2 | 5.5 |
|  | 3rd year (Z) | 9.8 | 6.7 | 10 | 8.4 | 15 | 12 | 12 | 14 | 10 | 12 |
|  | Z/Y | 1.5 | 1.2 | 1.5 | 1.6 | 2.6 | 2.5 | 2.7 | 2.9 | 3.2 | 2.2 |
| Antifouling property | after 1 year | 0 | 0 | 0 | 0 | 0 | 0 | 0 | 0 | 0 | 0 |
|  | after 2 years | 0 | 0 | 0 | 0 | 0 | 0 | 0 | 0 | 5 | 0 |
|  | after 3 years | 0 | 0 | 0 | 0 | 0 | 0 | 0 | 5 | 30 | 0 |
| Storage stability |  | 15 | <5 | 10 | 7 | >30 | <5 | <5 | <5 | <5 | <5 |

The details of the components in Tables 4 to 6 are as described below.
(1) Cuprous oxide: "NC-301" available from NC TECH Co., Ltd.
(2) Antifouling agent A: ZPT (zinc pyrithione) ("Zinc Omadine" available from Arch Chemicals, Inc.)
(3) Antifouling agent B: CuPT (copper pyrithione) ("Copper Omadine" available from Arch Chemicals, Inc.)
(4) Colloidal silica: ("SNOWTEX 20" available from Nissan Chemical Industries, Ltd.)
(5) Bengala: "Toda Color KN-R" available from Toda Kogyo Corp.
(6) Flowers of zinc: "Zinc Oxide Grade No. 2" available from Sakai Chemical Industry Co., Ltd.
(7) Polyvinyl ethyl ether: ("Lutonal A25" available from BASF Japan Ltd.)
(8) Chlorinated paraffin: (Toyoparax A 50 available from Tosoh Corporation)
(9) Rosin: ("WW rosin" available from Arakawa Chemical Industries, Ltd.)
(10) Zinc rosinate: synthesized by adding 48 g of flowers of zinc and 200 g of xylene to 400 g of WW rosin described above and removing 21 g of water and 115 g of xylene under reflux by heating.

The invention claimed is:

1. A vehicle resin for an antifouling coating composition, the vehicle resin being a copolymer comprising:

a structural unit (A) derived from a polymerizable monomer (a) having a silicon atom-containing group represented by the following formula (1):

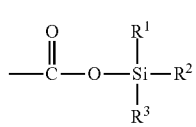

(1)

[in the formula (1), $R^1$, $R^2$, and $R^3$ each independently represent a hydrocarbon group having a carbon number of 1 to 6]; and a structural unit (B) derived from a polymerizable monomer (b) copolymerizable with the polymerizable monomer (a), wherein the polymerizable monomer (a) is a monomer represented by the following formula (2):

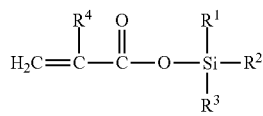

(2)

[in the formula (2), $R^1$, $R^2$, and $R^3$ each independently represent a hydrocarbon group having a carbon number of 1 to 6, and $R^4$ represents a hydrogen atom or a methyl group], a content of the structural unit (A) is greater than or equal to 50 mass % and less than or equal to 60 mass % in 100 mass % of the copolymer, a content of the structural unit (B) is greater than or equal to 40 mass % and less than or equal to 50 mass % in 100 mass % of the copolymer, the structural unit (B) includes a structural unit derived from a (meth)acrylate containing an alkoxy group and/or an oxyalkylene chain in ester moiety thereof, and an acid value derived from free carboxy group is greater than or equal to 0.1 KOHmg/g and less than or equal to 60 KOHmg/g.

2. The vehicle resin according to claim 1, wherein the acid value is greater than or equal to 0.1 KOHmg/g and less than or equal to 30 KOHmg/g.

3. The vehicle resin according to claim 1, wherein the acid value is greater than or equal to 0.3 KOHmg/g and less than or equal to 20 KOHmg/g.

4. The vehicle resin according to claim 1, wherein the structural unit (B) includes a structural unit derived from (meth)acrylic acid, and a content of the structural unit derived from (meth)acrylic acid is greater than or equal to 0.02 mass % and less than or equal to 8 mass % in 100 mass % of the copolymer.

5. An antifouling coating composition comprising the vehicle resin according to claim 1.

6. The antifouling coating composition according to claim 5, further comprising an antifouling agent.

* * * * *